(12) United States Patent
Wischmeyer

(10) Patent No.: US 9,625,716 B2
(45) Date of Patent: Apr. 18, 2017

(54) OMNIDIRECTIONAL HUD

(71) Applicant: Gulfstream Aerospace Corporation, Savannah, GA (US)

(72) Inventor: Ed Wischmeyer, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 692 days.

(21) Appl. No.: 13/889,820

(22) Filed: May 8, 2013

(65) Prior Publication Data

US 2014/0333510 A1    Nov. 13, 2014

(51) Int. Cl.
*G02B 27/01*   (2006.01)
*B64D 43/00*   (2006.01)
*B64D 45/00*   (2006.01)

(52) U.S. Cl.
CPC ......... *G02B 27/0101* (2013.01); *B64D 43/00* (2013.01); *B64D 45/00* (2013.01); *G02B 2027/0134* (2013.01)

(58) Field of Classification Search
CPC  B64D 43/00; B64D 45/00; G02B 2027/0134; G02B 27/0101
See application file for complete search history.

(56) References Cited

U.S. PATENT DOCUMENTS

| | | | | |
|---|---|---|---|---|
| 8,094,188 B1* | 1/2012 | Yum | ................... | G01C 23/005 340/974 |
| 2010/0321170 A1* | 12/2010 | Cooper | .................. | G02B 27/01 340/425.5 |
| 2012/0256768 A1* | 10/2012 | Kratchounova | ....... | G01C 23/00 340/973 |
| 2013/0076997 A1* | 3/2013 | Sakai | ................. | G02B 27/2264 349/13 |
| 2013/0083081 A1* | 4/2013 | Silverstein | ........... | H04N 9/3117 345/690 |
| 2013/0162632 A1* | 6/2013 | Varga | .................... | G06T 19/006 345/419 |

FOREIGN PATENT DOCUMENTS

| | | | | |
|---|---|---|---|---|
| CA | WO 2012021967 A1 * | 2/2012 | ............ | A61B 3/113 |
| WO | 2007005658 A2 | 1/2007 | | |

* cited by examiner

*Primary Examiner* — Latanya Bibbins
(74) *Attorney, Agent, or Firm* — Lorenz & Kopf, LLP (LKGlobal)

(57) ABSTRACT

Systems and aircraft are provided. The systems and aircraft include a controller, a projection surface, and at least one pair of active shutter 3-D glasses. The 3-D projector is configured to project a first 3-D HUD layout onto a projection surface. The projection surface is configured for displaying the 3-D HUD layout. The controller is operatively coupled with the 3-D projector and is configured to control the projector to project the 3-D HUD layout onto the projection surface. The first pair of active shutter 3-D glasses is configured to synchronize with the 3-D projector to present the first 3-D HUD layout to a first user.

20 Claims, 3 Drawing Sheets

OMNIDIRECTIONAL HUD

TECHNICAL FIELD

The technical field relates generally to head-up displays, and more particularly relates to head-up displays with 3-D projection and active shutter glasses.

BACKGROUND

As modern aviation advances, the demand for ever-increasing flight envelopes and pilot performance grows. To help meet this demand on the aircraft and on the pilots, modern aircraft include impressive arrays of displays, instruments, and sensors designed to provide the pilot with menus, data, and graphical options intended to enhance pilot performance and overall safety of the aircraft and the passengers.

One type of display is known as a head-up display (HUD). A typical HUD includes an optical collimator that projects light onto an angled glass combiner located between the pilot and the windshield of the aircraft. The typical HUD faces directly forward from the pilot and the images are projected on the combiner to appear to be at optical infinity to the pilot. These optical requirements and costly HUD components restrict the size of the HUD and the field of view (FOV) that is visible to the sides of the HUD. For example, in crosswind landing scenarios where an aircraft is at a large angle relative to a runway, the runway may be outside the FOV of these typical HUDS. In such situations, the pilot may be unable to see both the runway and the beneficial flight information and runway overlays displayed on the HUD as the aircraft lands.

Accordingly, it is desirable to provide a HUD with a wider FOV and larger viewable area ["eye box"]. In addition, it is desirable to provide a HUD that is not limited to placement directly in front of a pilot. Furthermore, other desirable features and characteristics of the present invention will become apparent from the subsequent detailed description of the invention and the appended claims, taken in conjunction with the accompanying drawings and this background of the invention.

SUMMARY

Various non-limiting embodiments of a heads-up display system, a vehicle, and an aircraft are disclosed herein.

In a first non-limiting embodiment, the head-up display (HUD) system includes, but is not limited to, a controller, a projection surface, and at least one pair of active shutter 3-D glasses. The 3-D projector is configured to project a first 3-D HUD layout onto a projection surface. The projection surface is configured for displaying the 3-D HUD layout. The controller is operatively coupled with the 3-D projector and is configured to control the projector to project the 3-D HUD layout onto the projection surface. The first pair of active shutter 3-D glasses is configured to synchronize with the 3-D projector to present the first 3-D HUD layout to a first user.

In another non-limiting embodiment, the vehicle includes, but is not limited to, a controller, a window, a 3-D projector, and a first pair of active shutter 3-D glasses. The 3-D projector is configured to project a first 3-D HUD layout. The window is configured to display the projected first 3-D HUD layout. The controller is operatively coupled with the 3-D projector and is configured to control the projector to project the first 3-D HUD layout onto the windshield. The first pair of active shutter 3-D glasses is configured to synchronize with the 3-D projector to present the first 3-D HUD layout to a first user.

In another non-limiting embodiment, the aircraft includes a controller, an aircraft windshield, at least one 3-D projector, a first pair of active shutter 3-D glasses, and a second pair of active shutter 3-D glasses. The 3-D projector is configured to project a first 3-D HUD layout and a second 3-D HUD layout. The aircraft windshield is configured to display the projected first 3-D HUD layout and second 3-D HUD layout. The controller is operatively coupled with the 3-D projector and is configured to control the projector to project the first and second 3-D HUD layouts onto the windshield. The first pair of active shutter 3-D glasses is configured to synchronize with the 3-D projector to present the first 3-D HUD layout to a first user. The second pair of active shutter 3-D glasses is configured to synchronize with the 3-D projector to present the second 3-D HUD layout to a second user.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

Figure 1:
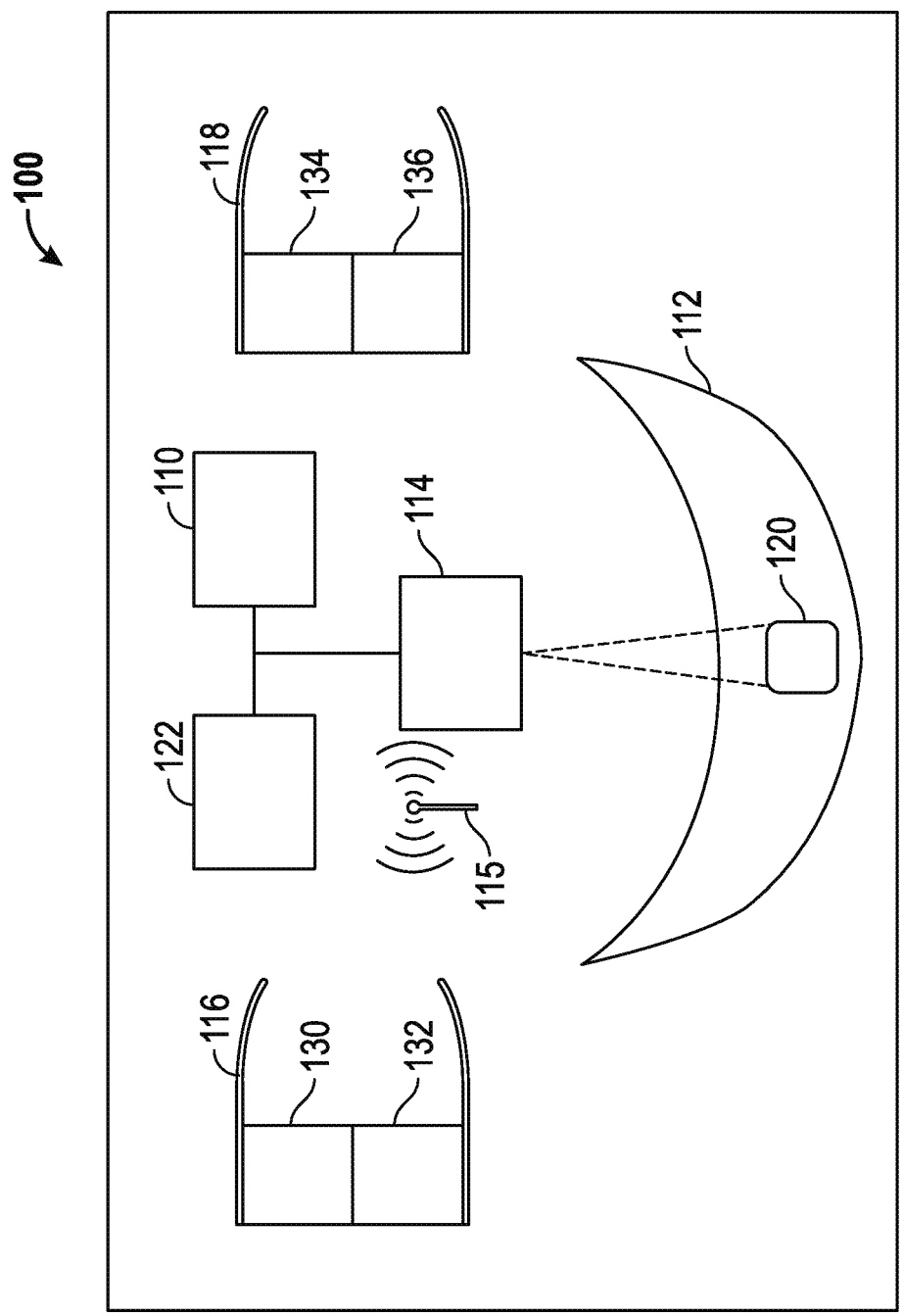
FIG. 1 is a simplified block diagram of an omnidirectional HUD system according to some embodiments.

The following detailed description is merely exemplary in nature and is not intended to limit application and uses. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the block diagrams shown herein depict example arrangements of elements, additional intervening elements, devices, features, or components may be present in an actual embodiment.

Finally, for the sake of brevity, conventional techniques and components related to computer systems and other functional aspects of a computer system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

In some embodiments as disclosed herein, a vehicle includes an omnidirectional head-up display (HUD) system. For example, the omnidirectional HUD system may be utilized to maximize instrument panel real estate, reduce crew workload, provide an additional layer of display redundancy, and/or provide greater flexibility to the users in customizing their instrument panels. In some embodiments, the omnidirectional HUD provides two different display layouts to two different users. The display layouts are arrangements of HUD elements that are to be projected onto the projection surface. In other words, the layout is what the users will see on the HUD. By utilizing active shutter 3-D glasses, non-collimated light may be made to appear at optical infinity or other distances from the user.

Referring now to FIG. 1, an example of a HUD system 100 is illustrated in accordance with some embodiments. The HUD system 100 includes a controller 110, a windshield 112, a projector 114, a first pair of active shutter glasses 116, and a second pair of active shutter glasses 118. The controller 110 is configured to generate 3-D HUD layouts that include HUD elements 120. The HUD elements 120 convey operational information or flight data to pilots of an aircraft. The controller may include any combination of software and hardware. For example, the controller may include an application specific integrated circuit (ASIC), an electronic circuit, a processor (shared, dedicated, or group) and memory that execute one or more software or firmware programs, a combinational logic circuit, and/or other suitable components that provide the described functionality.

It should be appreciated that the HUD system 100 is described in relation to an aircraft for ease of description. The HUD system 100 may be utilized in other vehicles or buildings without departing from the scope of the present disclosure. For example, the windshield may be a vehicle side window, rear window, or other window. The buildings may include control towers of airports, harbors, rail yards, truck yards, or other buildings where a window or other surface is projected on by a projector. Expensive collimating equipment is not required to focus the displayed information at distance corresponding to objects that are present or to focus at optical infinity or other distances. For example, the projected image may be projected to overlay a non-visible object (e.g., hidden by atmospheric obstruction, vehicle/building not having a window, or by another object).

Data for the HUD elements may be obtained from a plurality of sensors 122 disposed throughout the aircraft. For example, the controller 110 may use data from the sensors 122 to display any of the information found on the primary flight display (such as attitude information, flight trajectory, air speed, altitude, and autopilot status). In some embodiments, the HUD elements 120 display synthetic vision that represents what the outside terrain would look like if it could be seen, or any kind of enhanced vision (infrared, radar, fused imagery, enhanced visual, and other such kind data sources). Additional displayed information could include weather, traffic, other threats, safe flight routes, highway in the sky guidance, or other kinds of information.

Each of the HUD layouts generally includes at least two separate images that are intended to be viewed from different eyes of the pilot to change the perceived distance to the HUD element 120. For example, a first image and a second image may include substantially the same content but be translated by a distance that determines the perceived distance from a pilot to the HUD element 120. In some embodiments, the perceived distance is set to optical infinity. The first and second images may be updated and repeatedly displayed to provide a seemingly continuous view of the HUD layout for the pilot.

When different HUD layouts are designated for simultaneous use by two pilots in the aircraft, the controller 110 may generate different HUD elements 120 with different data and images for each of the two pilots. For example, the first pilot may configure the HUD system 100 to display airspeed in the center of the windshield, while a second pilot may configure the HUD system to display altitude in the center of the windshield. To display the different HUD elements 120, the controller 110 generates first and second images that include airspeed data for displaying a first 3-D HUD layout to the first pilot. The controller 110 also generates third and fourth images that include altitude data for displaying a second 3-D HUD layout to the second pilot. The images are selectively exposed to the eyes of the pilot by use of the projector 114 and the active shutter glasses 116, 118, as will be described below.

When oriented in a cockpit of the aircraft, the projector 114 and windshield 112 are oriented at angles such that at least some of the projected light is redirected towards the pilots. The windshield 112 is disposed in front of and at least partially to the sides of the pilots of the aircraft. In the example provided, the windshield 112 is illustrated as a single piece of transparent material. It should be appreciated that the windshield 112 may be other windows or may include multiple pieces of glass or other substantially transparent material without departing from the scope of the present disclosure. For example, windows to the side of the pilots in the aircraft are generally part of the windshield as used herein. In some embodiments, other surfaces are utilized as projection receiving surfaces. For example, a screen material or separate glass component may be located in the cockpit of the aircraft for displaying the projected HUD elements.

The projector 114 projects the HUD layouts onto the windshield 112 to display the HUD elements 120 to the pilots of the aircraft. In the example provided, the projector 114 is a three dimensional (3-D) projector that projects separate images for each active shutter of the active shutter glasses 116, 118. For example, the 3-D projector may project the HUD element 120 by projecting two offset images that will be perceived by the pilot as a HUD element 120 located at a predefined distance away from the pilot. In FIG. 1, only one projector 114 is illustrated. It should be appreciated that multiple projectors may be utilized to project over a larger area or to project at different angles onto the windshield 124 without departing from the scope of the present invention.

In some embodiments, the projector 114 communicates with the glasses 116, 118 by use of a wireless communication device 115. The device 115 permits the projector 114 and the glasses 116, 118 to synchronize the projected images with exposure to particular eyes of the user. It should be appreciated that any suitable wireless communication protocol or other method of synchronization may be utilized without departing from the scope of the present disclosure.

The first pair of active shutter glasses 116 includes a first portion 130 and a second portion 132 that are disposed in front of different eyes of the user when worn. The first portion 130 includes a first active shutter for selectively obstructing light passage through the first portion 130, and the second portion 132 includes a second active shutter for selectively obstructing light passage through the second portion 132. The first portion 130 is synchronized with the projector 114 to be substantially transparent when the projector 114 is projecting the first image, and to obstruct light passage when the projector 114 is projecting the second, third, and fourth images. The second portion 132 is synchronized with the projector 114 to be substantially transparent when the projector 114 is projecting the second image, and to obstruct light passage when the projector is projecting the first, third, and fourth images. Accordingly, the user of the first pair of active shutter glasses 116 is able to view the first 3-D HUD layout.

The second pair of active shutter glasses 118 includes a first portion 134 and a second portion 136. The first portion 134 includes a first active shutter for selectively obstructing light passage through the first portion 134 and the second portion 136 includes a second active shutter for selectively obstructing light passage through the second portion 136. The first portion 134 is synchronized with the projector 114 to be substantially transparent when the projector 114 is projecting the third image, and to obstruct light passage when the projector 114 is projecting the first, second, and fourth images. The second portion 136 is synchronized with the projector 114 to be substantially transparent when the projector 114 is projecting the fourth image, and to obstruct light passage when the projector is projecting the first, second, and third images. Accordingly, the user of the second pair of active shutter glasses 118 is able to view the second 3-D HUD layout.

The active shutters may incorporate any suitable technology for partially or wholly obstructing passage of light through the portions 130, 132. For example, the active shutters may utilize a liquid crystal layer that obstructs or allows light passage when a voltage is applied.

Figure 2:
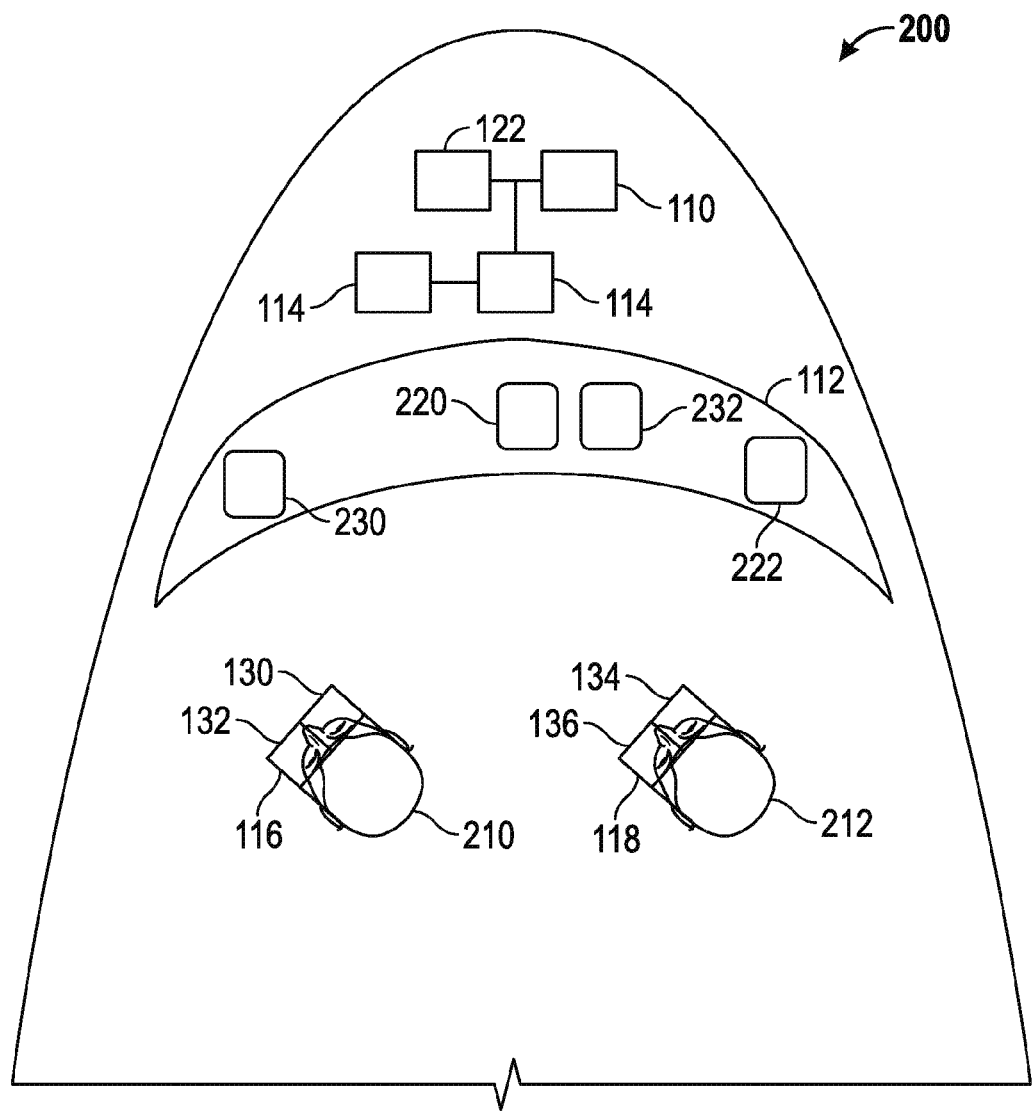
FIG. 2 is a top view of an aircraft front end that includes the omnidirectional HUD system of FIG. 1 according to some embodiments.

Referring now to FIG. 2, a front end 200 of an aircraft that includes the HUD system 100 is illustrated in accordance with some embodiments. It should be appreciated that the HUD system 100 may be utilized in other vehicles or environment without departing from the scope of the present disclosure. For example, the HUD system 100 may be utilized in ships, land vehicles (e.g., tanks, infantry fighting vehicles, etc.), or control towers (e.g., in an airport, harbor, or rail yard).

The HUD system 100 further includes a second 3-D projector 114 that cooperates with the first 3-D projector to project the 3-D layouts over substantially the entire windshield 112. A first pilot 210 is wearing the first pair of active shutter glasses 116 and a second pilot 212 is wearing the second pair of active shutter glasses 118. The first pilot 210 and the second pilot 212 are viewing different layouts of HUD elements on the windshield 112.

Figure 3A:
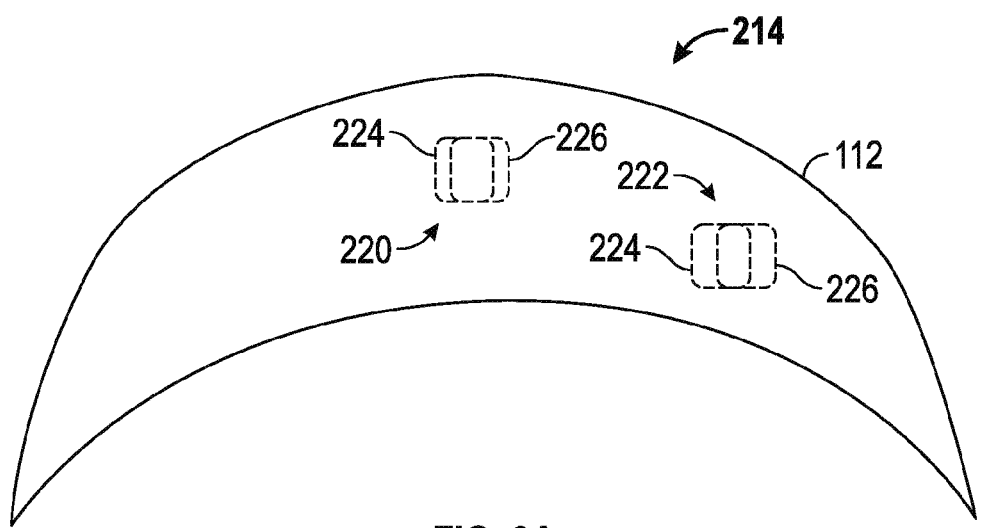
FIG. 3A is a simplified diagram of a first three dimensional (3-D) display layout in accordance with some embodiments.

The first pilot 210 is viewing a first 3-D display layout 214 as illustrated in FIG. 3A. The first display layout 214 includes a first HUD element 220 located near the center of the windshield 112 and a second HUD element 222 located on a far side of the windshield 112. The first display layout 214 represents cooperation between a first image 224 displayed at a first period in time and a second image 226 displayed at a second period in time.

The first portion 130 of the first pair of active shutter glasses 116 opens to be transparent during the first projection period in time and closes to be at least partially opaque during each other projection period in time. Accordingly, a first eye of the first pilot 210 is exposed to the first image 224. The second active portion 132 of the first pair of active shutter glasses 116 opens to be transparent during the second period in time and closes to be at least partially opaque during each other period in time. Accordingly, a second eye of the pilot 210 is exposed to the second image 226. The first pilot 210 perceives the first and second HUD elements 220, 222 at a distance determined by the differences between the first and second images 224, 226.

Figure 3B:
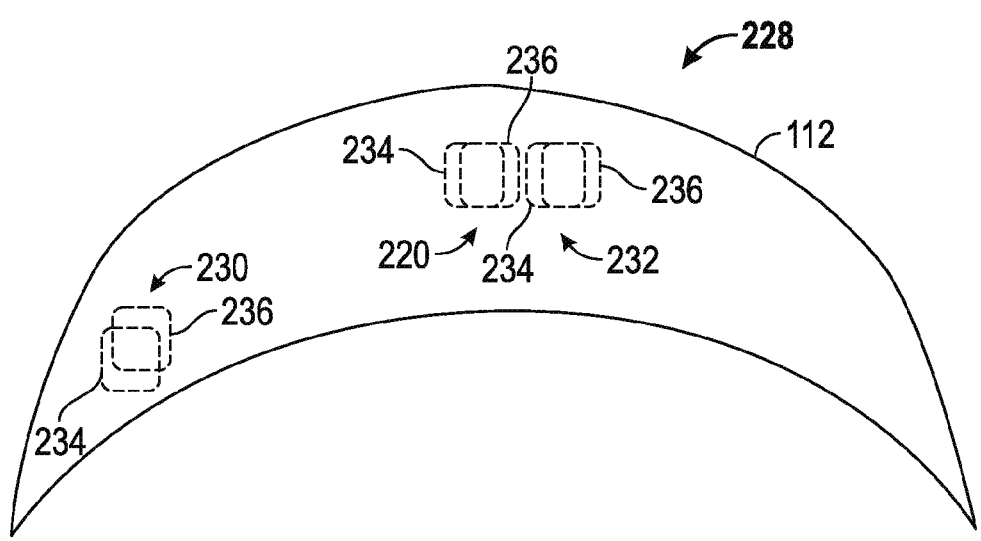
FIG. 3B is a simplified diagram of a second three dimensional (3-D) display layout in accordance with some embodiments.

The second pilot 212 is viewing a second 3-D display layout 228 as illustrated in FIG. 3B. The second display layout 228 includes the first HUD element 220, a third HUD element 230, and a fourth HUD element 232. The second 3-D display layout 228 represents cooperation between a third image 234 displayed at a third period in time and a fourth image 236 displayed at a fourth period in time.

The first portion 134 of the second pair of active shutter glasses 118 opens to be transparent during the third period in time and closes to be at least partially opaque during each other period in time. Accordingly, a first eye of the second pilot 212 is exposed to the third image 234. The second portion 136 of the second pair of active shutter glasses 118 opens to be transparent during the fourth period in time and closes to be at least partially opaque during each other period in time. Accordingly, a second eye of the second pilot 212 is exposed to the fourth image 236. The second pilot 212 perceives the first, third, and fourth HUD elements 220, 230, 232 at a distance determined by the differences between the third and fourth images 234, 236. It should be appreciated that the number, placement, and size of the HUD elements configured for viewing by each of the pilots 210, 212 may vary without departing from the scope of the present disclosure.

In some embodiments, opening and closing of the first and second portions 134, 136 may be controlled to reduce the intensity of light reaching the user's eyes. For example, both the first and second portions 134, 136 may be closed for periods of time. Accordingly, the active shutter glasses 118 may also act as sunglasses to reduce the intensity of, for example, the sun reaching the pilot's eyes.

The embodiments provided herein provide numerous advantages over prior systems. For example, by projecting 3-D information onto the cockpit windows or other surfaces while two pilots wear active shutter 3-D glasses, displayed information can be made to appear to be at any desired distance (e.g., 30 feet or effective optical infinity) without limitations of HUD field of view or eye box. Furthermore, separate displays can be shown to each pilot with appropriate time synchronization to address the problem of looking out the windows on the side of the cockpit where the other pilot is seated. Additionally, the principles of the disclosure permit additional opportunities for non-forward facing displays or a wider field of view for applications such as synthetic vision. The wider field of view for synthetic vision may prove particularly advantageous on the ground in low visibility. The embodiments provided herein may also use head tracking to display 3-D information only where each user is looking. Further additional "screen real estate" for displays, charts, and other information may also be realized.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A head-up display (HUD) system, the HUD system comprising:
   a 3-D projector configured to project a first 3-D HUD layout;
   a projection surface configured to display the projected first 3-D HUD layout;
   a controller operatively coupled with the 3-D projector, the controller configured to control the projector to project the first 3-D HUD layout onto the projection surface; and
   a first pair of active shutter 3-D glasses configured to synchronize with the 3-D projector to present the first 3-D HUD layout to a first user.

2. The HUD system of claim 1 wherein the 3-D projector is further configured to project the first 3-D HUD layout utilizing non-collimated light, and wherein the controller is further configured to generate the 3-D HUD layout based on a distance to objects beyond the projection surface.

3. The HUD system of claim 1 further comprising a second pair of active shutter 3-D glasses, and wherein the controller is further configured to generate a second 3-D HUD layout, the 3-D projector is configured to alternately project the first 3-D HUD layout and the second 3-D HUD layout onto the projection surface, and the second pair of active shutter 3-D glasses is configured to synchronize with the 3-D projector to present the second 3-D HUD layout to a second user.

4. The HUD system of claim 3 wherein the first pair of active shutter 3-D glasses is configured to prevent the first user from viewing the second 3-D HUD layout and the second pair of active shutter 3-D glasses is configured to prevent the second user from viewing the first 3-D HUD layout.

5. The HUD system of claim 4 wherein the 3-D projector is configured to project each of a first image of the 3-D HUD layout, a second image of the 3-D HUD layout, a third image of the second 3-D HUD layout, and a fourth image of the second 3-D HUD layout at different times.

6. The HUD system of claim 5 wherein the first pair of active shutter 3-D glasses and the second pair of active shutter 3-D glasses each include a first portion and a second portion, and wherein the first portion of the first pair of active shutter 3-D glasses is configured to close when the 3-D projector projects the second, third, and fourth images, and wherein the second portion of the first pair of active shutter 3-D glasses is configured to close when the 3-D projector projects the first, third, and fourth images, and wherein the first portion of the second pair of active shutter 3-D glasses is configured to close when the 3-D projector projects the first, second, and fourth images, and wherein the second portion of the second pair of active shutter 3-D glasses is configured to close when the 3-D projector projects the first, second, and third images.

7. The HUD system of claim 1 wherein the projection surface is an aircraft windshield configured to be disposed at least partially in front of and partially to the side of a pilot seat in a cockpit of the aircraft.

8. The HUD system of claim 1 further comprising a second 3-D projector.

9. The HUD system of claim 8 wherein the 3-D projector and the second 3-D projector are configured to project over substantially an entire area of the projection surface.

10. A vehicle comprising:
    a 3-D projector configured to project a first 3-D HUD layout;
    a window configured to display the projected first 3-D HUD layout;
    a controller operatively coupled with the 3-D projector, the controller configured to control the projector to project the first 3-D HUD layout onto the window based on a distance of objects or terrain along a direction of travel of the vehicle; and
    a first pair of active shutter 3-D glasses configured to synchronize with the 3-D projector to present the first 3-D HUD layout to a first user.

11. The vehicle of claim 10 further comprising a second pair of active shutter 3-D glasses, and wherein the controller is further configured to generate a second 3-D HUD layout and the 3-D projector is configured to alternately project the first 3-D HUD layout and the second 3-D HUD layout onto the window, and wherein the first pair of active shutter 3-D glasses is configured to synchronize with the 3-D projector to obstruct viewing the second 3-D HUD layout and the second pair of active shutter 3-D glasses is configured to synchronize with the 3-D projector to obstruct viewing the first 3-D HUD layout.

12. The vehicle of claim 10 wherein the 3-D projector is one of a plurality of 3-D projectors.

13. The vehicle of claim 12 wherein the plurality of 3-D projectors are configured to project over substantially an entire area of the window.

14. An aircraft comprising:
    a 3-D projector configured to project a first 3-D HUD layout and a second 3-D HUD layout;
    an aircraft windshield configured to display the projected first 3-D HUD layout and second 3-D HUD layout;
    a controller operatively coupled with the 3-D projector, the controller configured to control the projector to project the first and second 3-D HUD layouts onto the windshield;
    a first pair of active shutter 3-D glasses configured to synchronize with the 3-D projector to present the first 3-D HUD layout to a first user; and
    a second pair of active shutter 3-D glasses configured to synchronize with the 3-D projector to present the second 3-D HUD layout to a second user.

15. The aircraft of claim 14 wherein the first pair of active shutter 3-D glasses is configured to obstruct viewing the second 3-D HUD layout and the second pair of active shutter 3-D glasses is configured to obstruct viewing the first 3-D HUD layout.

16. The aircraft of claim 15 wherein the 3-D projector is configured to project each of a first image of the first 3-D HUD layout, a second image of the first 3-D HUD layout, a third image of the second 3-D HUD layout, and a fourth image of the second 3-D HUD layout at different times.

17. The aircraft of claim 16 wherein the first pair of active shutter 3-D glasses and the second pair of active shutter 3-D glasses each include a first portion and a second portion, and wherein the first portion of the first pair of active shutter 3-D glasses is configured to obstruct exposure to the second, third, and fourth images, and wherein the second portion of the first pair of active shutter 3-D glasses is configured to obstruct exposure to the first, third, and fourth images.

18. The aircraft of claim 17 wherein the first portion of the second pair of active shutter 3-D glasses is configured to obstruct exposure to the first, second, and fourth images, and wherein the second portion of the second pair of active shutter 3-D glasses is configured to obstruct exposure to the first, second, and third images.

19. The aircraft of claim 14 wherein the 3-D projector is further configured to project over a side window of the windshield to project over substantially an entire area of the aircraft windshield.

20. The aircraft of claim 14 further including a plurality of sensors communicatively coupled with the controller, and wherein the controller is configured to generate the first and second 3-D HUD layouts in response to data input from the plurality of sensors.

\* \* \* \* \*